Jan. 21, 1941.   J. A. ZUBLIN   2,229,540
METHOD OF REPRESSURING OIL AND GAS WELLS
Filed May 1, 1939   2 Sheets-Sheet 1

INVENTOR
JOHN A. ZUBLIN
James T. Bethell
His Agent

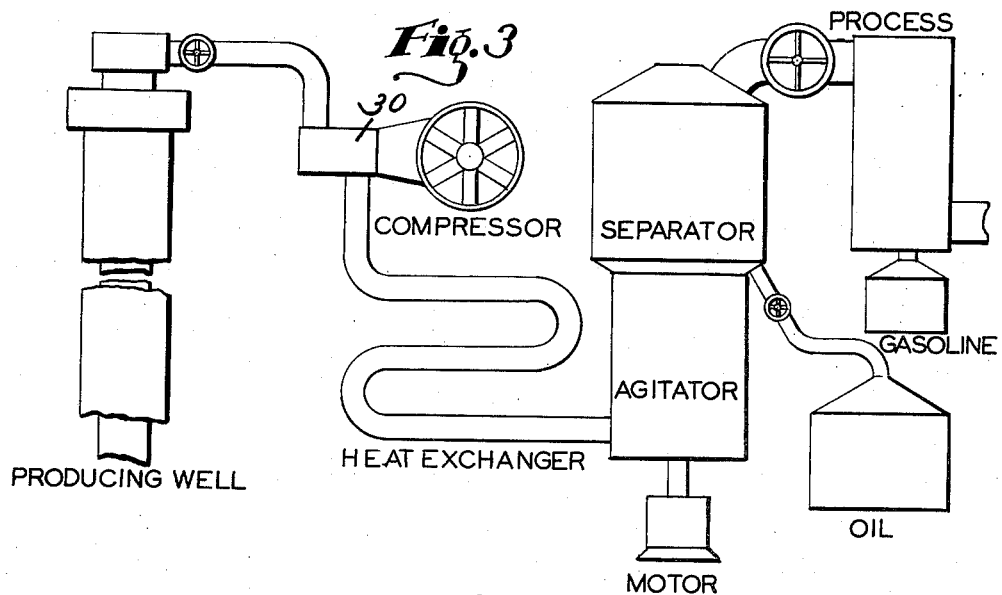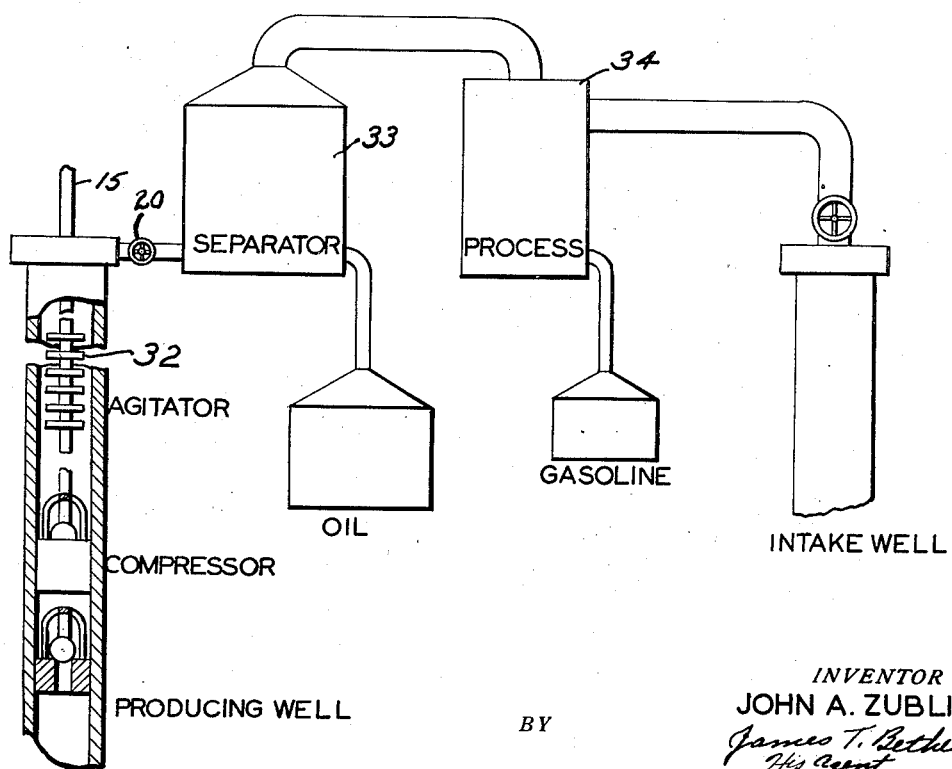

Patented Jan. 21, 1941

2,229,540

UNITED STATES PATENT OFFICE 2,229,540

METHOD OF REPRESSURING OIL AND GAS WELLS

John A. Zublin, Los Angeles, Calif.

Application May 1, 1939, Serial No. 271,229

5 Claims. (Cl. 166—21)

This invention is in the field of oil production, and more particularly relates to production from flowing wells.

The present day operation of oil wells, aiming at the most efficient utilization of oil deposits, has evolved the technique of repressing the formation; which is to say, gas is driven into the formation through an intake well, with the result that more oil ultimately becomes available from the formation, and more oil is lifted to the surface by gas pressure, than would be if the gas were withdrawn from the formation and never replaced. However, this involves a very expensive compression cycle, the oil and gas, as they are brought to the surface by the formation pressure, being separated at comparatively low pressures in surface separators, and the gas recompressed to the pressure necessary to drive it into the intake well. As the pressure obtaining in the intake well is of the order of several thousands of pounds per square inch, and approximately two-thirds of the compressor work is converted into heat, the operation of compressing the gas comprises a very large proportion of the total expense of operating an oil field. Legislative enactments make it imperative that wells be operated on a recycling or repressuring basis, with the result that many wells, delivering a great deal of gas with the oil, must be shut down, with the resultant loss of large investments in the original development of the well.

In order to make the nature of my invention plainer, attention is invited to the following facts pertinent to the production of oil.

As delivered to the eduction tube, at the bottom of the well, oil and gas commonly are mixed together. The oil-gas mixture contains not only gas mechanically mixed therein, but gas dissolved therein, and gas in the liquid phase dissolved therein. It is also believed that much gas is occluded in the oil. It is to be remembered, of course, that the gas and oil exist at enormous pressures, several thousands of pounds to the square inch, and are quite different from what they would be if they were at lower pressures.

The gas-oil mixture, (this term being used loosely to define the oil and any gas which would be present at atmospheric conditions of temperature and pressure) has two characteristics worthy of note. The first is the existence of a "bubble point," which is to say, a temperature at which the gas separates from the oil in great quantities, for any given pressure. Conversely, for any given temperature, there is a pressure which causes the evolution of gas.

The second characteristic is the effect of agitation upon the gas-oil mixture. Agitation will cause a great increase in the free gas in a gas oil mixture, and, if carried out in a closed container, will build up the pressure of the enclosed mixture to very high values.

With the above in mind, I propose by my invention to accomplish the repressuring of formations in a more efficient manner than has heretofore been done.

It is an object of my invention to substitute for at least part of the recompression at present utilized in repressuring, a liquid phase pumping operation.

It is a further object of my invention, in supplying pressure to gas for ultimate return to the formation, to provide a medium for efficiently absorbing the heat of compression, thus lessening the energy required to compress the gas.

It is a further object of my invention to compress gas near the liquid phase into the liquid phase with consequent saving of compressor work.

It is a further object of my invention to save compressor work by redissolving some of the gas into the oil.

It is a further object of my invention to prevent or inhibit the evolution of free gas not present in the oil as delivered to the bottom of the eduction tube, until the gas oil mixture is at a point where such evolution is desired.

All of the above objects are for the practical object of removing the necessity, at least in part, of recompressing the free gas, as separated from the oil, from the pressures existing in the separator to those sufficient to drive the gas back into the well.

Briefly, I propose to accomplish these objects by compressing the oil gas mixture as it comes from the well, instead of compressing the free gas as separated from the oil. I then propose to separate the gas and oil at a high enough pressure and with sufficient agitation so that the gas as delivered from the separator has sufficient pressure to flow into the intake well with no, or very little, recompression. It is proposed to have the pressure sufficiently high to allow processing of the gas from the separator, with the attendant drop in pressure as the distillate is extracted, and leave the gas to be returned to the formation without recompression.

This compression of the gas oil mixture can take place at the tubinghead, if desired However, it is contemplated that such compression could also be done within the well in the eduction tube, near the oil formation. This will lead to a more efficient compression, as the gas present will be largely dissolved, occluded or in a liquid phase, and the action of the compressor more analogous to the action of a pump than a compressor, thus saving the unavoidable loss in compression of any gaseous phase constituents. At the tubinghead, the pressure is very much less than the pressure at the bottom of the well, because of the loss of static head alone, in modern deep wells, and the drop in pressure, along with the unavoidable agitation which takes place in the flow of the oil gas mixture up the well, leads to a release of gas which has to be recompressed.

The separation and agitation referred to may be accomplished by any suitable means, and may take place on the surface or within the well bore. The separation may take place within the agitator, either in or out of the well, or separate from the agitator.

Referring to the drawings:

Figures 3 and 4 are modifications of the apparatus of Figure 1.

Figures 1, 2:
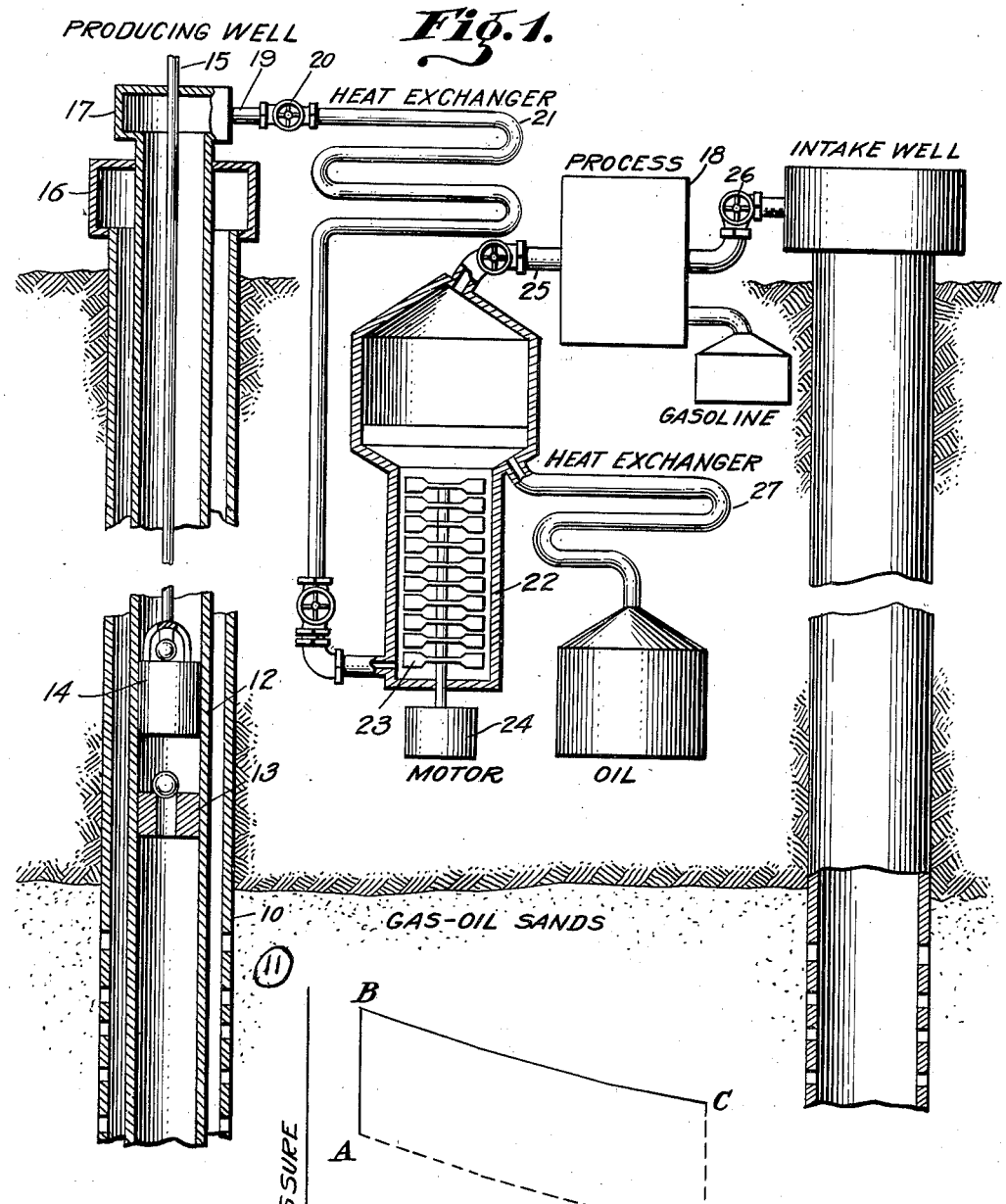
Figure 1 is a more or less diagrammatic showing of the apparatus of my invention.
Figure 2 is a pressure diagram illustrating the operation of my device.

Referring to Figure 1, 10 represents the casing of a well producing a gas oil mixture from the formation 11.

In the casing 10 is the eduction tubing 12, with the standing valve 13 within its length. In the eduction tubing is the pump plunger 14, driven by sucker rods 15 extending to the surface. Between the casing and the eduction tubing at the top of the well is the casinghead 16 to prevent escape of gas or oil from the annular space between the casing and the tubing. The eduction tubing 12 is furnished with a tubinghead 17. Leading from the tubinghead 17 is a pipe 19, equipped with valve 20, leading to a heat exchanger 21. From the heat exchanger is a pipe leading to the agitator 22 which comprises a vesesl containing a series of elements 23 rotated by a motor 24. The agitator has a high free space above the agitator, and a gas pipe 25 leads therefrom to process apparatus 18 for the extraction of distillate from the gas before it is returned to the ground. From the process, the gas flows to an intake well through the valve 26. Another pipe, below the fluid level in the agitator, leads to an oil storage tank by way of a heat exchanger 27.

In order to make my invention clearer, I have appended, in Figure 2, a pressure diagram of the oil and gas flowing through the apparatus. Point A is the pressure normally existing at the tubinghead. B is the pressure existing because of the pumping work performed by the plunger 14 in the well. C is the pressure necessary at the intake casinghead to drive the separated gas into the intake well. The solid line from B to C represents the pressure as the oil gas mixture, and finally the gas, passes through the apparatus. It may readily be appreciated that B can be made high enough so that the unavoidable pressure drops caused by friction in the lines and the expansion of the gas in the processing apparatus to release entrained distillate will still leave the pressure at the intake well sufficient to drive the gas back into the formation.

In contrast thereto, I have shown the present mode of operation by recycling gas, in Figure 2. Here, the gas and oil leaving the tubinghead at the pressure A, flow through the separation and surface treatment plant with similar differentials in pressures, ending up with a comparatively low pressure D. From D the released gas must be compressed to a sufficiently high pressure to drive it into an intake well C. This compression has been before stated as being an expensive, difficult and dangerous process.

The function of the heat exchanger 21 is to bring the gas oil mixture to a temperature such that it will be at its bubble point in the agitation and separation chamber. Agitation and separation can be carried out efficiently, releasing high pressure gas to the intake well. The oil, as it flows from the separator, may be of such temperature as to render it useful in the transfer of heat from or to the gas oil mixture, which can be done by utilizing the separated oil as the circulating medium, or part of the circulating medium, in the heat exchanger for the gas oil mixture.

In order to accomplish this result, regulation of the pressures in the various parts of the apparatus to bring the pressure in the separator sufficiently high to flow gas back in the ground is all that is necessary, gas returning as before, without recompression, or with very little recompression.

I have also shown in Figure 3 an apparatus for accomplishing everything on the surface of the ground, which involves the same method of operation as that of Figure 1, with the difference that the compressor is located on the ground. The corresponding parts have the same function as in the first form described, about the only difference being the compressor 30 shown as on the surface of the ground. Further description of the apparatus is believed unnecessary in view of the description of Figure 1.

Figure 4 shows a method of accomplishing the agitation in the well itself. Attached to the pump sucker rod above the plunger, are a series of agitators 32, of any suitable form. Agitation is accomplished by the movement of these agitators during reciprocation of the sucker rods. The gas oil mixture flows by valve 20 to a separator 33, whence wet gas flows to a processing plant 34 for the extraction of gasoline. The gas, still at a high pressure because of the initial compression of the gas oil mixture, flows back into the ground without recompression, or with less recompression than is normally necessary.

In the event that oil and gas will separate without agitation, compression of the gas oil mixture can be carried out, and subsequent separation performed without agitation. Similarly, in the event that the oil and gas as delivered to the separator have already a temperature at which they efficiently separate, the heat exchanger will not be necessary.

What I claim as my invention is:

1. The method of operating a well flowing a mixture of gas and oil to the casing thereof which includes compressing the mixture, agitating the compressed mixture to release gas therefrom, separating the released gas from the oil, processing the separated gas to remove distillate therefrom, flowing the processed gas to an oil bearing formation and conducting the gas-freed oil to appropriate disposal.

2. The method of operating a well flowing a mixture of gas and oil which includes compressing the gas oil mixture, agitating the compressed mixture to release at least a portion of the gas, separating and processing the gas so released to remove distillate therefrom and flowing the processed gas back into the formation.

3. The method of operating a well producing gas charged oil which includes compressing the gas charged oil to a pressure above that existing in the producing formation, agitating the compressed gas charged oil to release gas therefrom, processing the gas so released to remove distillate therefrom, flowing the processed gas back to the producing formation and conducting the oil to appropriate disposal.

4. The method of operating a well flowing gas charged oil to the casing thereof which includes compressing the gas charged oil, separating at least a portion of the gas from the oil, processing the separated gas to remove distillate therefrom, flowing the processed gas to an oil bearing formation and conducting the gas-freed oil to appropriate disposal.

5. The method of operating a well flowing a mixture of gas and oil to the casing thereof which includes compressing the gas oil mixture, bringing the temperature of the compressed mixture to its bubble point, separating gas from the oil, processing the separated gas to remove distillate therefrom, flowing the processed gas to an oil bearing formation and conducting the gas-freed oil to appropriate disposal.

JOHN A. ZUBLIN.